United States Patent [19]
Haraguchi

[11] Patent Number: 5,400,312
[45] Date of Patent: Mar. 21, 1995

[54] APPARATUS FOR AND METHOD OF READING DATAS RECORDED ON AN OPTICAL DISC

[75] Inventor: Yukiyoshi Haraguchi, Saitama, Japan

[73] Assignee: Pioneer Electronic Corporation, Tokyo, Japan

[21] Appl. No.: 126,980

[22] Filed: Sep. 24, 1993

[30] Foreign Application Priority Data

Oct. 1, 1992 [JP] Japan .................................. 4-263501

[51] Int. Cl.⁶ ............................................. G11B 7/095
[52] U.S. Cl. .................................... 369/124; 369/112; 369/120; 369/44.37; 369/44.41
[58] Field of Search ................ 369/124, 112, 120, 121, 369/44.32, 44.38, 44.41, 93, 95, 111

[56] References Cited

U.S. PATENT DOCUMENTS 5,235,584  8/1993  Yoshio et al. .................... 369/44.37

Primary Examiner—Paul M. Dzierzynski
Assistant Examiner—Kiet T. Nguyen
Attorney, Agent, or Firm—Kane, Dalsimer, Sullivan, Kurucz, Levy, Eisele and Richard

[57] ABSTRACT

An apparatus reads data signals recorded on an optical disc on which a gathering track including n recording tracks and a guard track neighboring to the gathering track are spirally formed. The apparatus includes: light beam irradiating unit for irradiating (n+1) light beams onto boundaries of the n recording tracks and the guard track, photodetecting unit for receiving (n+1) light beams reflected by the surface of the optical disc and producing (n+1) track boundary data signals, and computing unit for calculating the (n+1) track boundary data signals to produce n read-out data signal corresponding to the data signals recorded on the n recording tracks.

7 Claims, 6 Drawing Sheets

APPARATUS FOR AND METHOD OF READING DATAS RECORDED ON AN OPTICAL DISC

BACKGROUND OF THE INVENTION

1. Field of the Invention

This invention relates to an apparatus and a method for reading data signals from an optical disc, and more particularly to an apparatus and a method of reading data signals from a high-density optical disc and cancelling crosstalk.

2. Description of the Prior Art

There is known a problem called "crosstalk" which occurs when data signals recorded on an optical disc is to be read out. Crosstalk is a phenomenon that a read-out data signal of adjacent tracks are mixed into a read-out data signal of a target track to be read-out because a diameter of reading light beam spot is larger than a width of each tracks. In order to cancel the crosstalk, it is conventionally known a method of irradiating the light beam onto the target track and the tracks adjacent thereto, calculating the crosstalk component from the read-out data signals according to various computing algorithms, and subtracting it from the read-out data signal of the target track.

However, in order to increase an accuracy of crosstalk cancellation by the conventional method, calculation circuits must be designed more complicated and hence an operation time of calculating an crosstalk cancelling coefficient becomes longer. Further, recently, minimization of track width has been examined so as to further increase recording density of an optical disc. However, if the track width is reduced without minimizing the spot diameter of light beam, crosstalk component will be increased, and therefore it becomes difficult to sufficiently cancel the crosstalk component and accurately obtain the recorded data signal.

SUMMARY OF THE INVENTION

It is an object of the present invention to provide an apparatus for and a method of reading data signals recorded on an optical disc capable of cancelling crosstalk by relatively simple computation and accurately producing the recorded data signal, by irradiating the light beam onto boundaries of recording tracks.

According to one aspect of the present invention, there is provided an apparatus for reading data signals recorded on an optical disc on which a gathering track including n recording tracks and a guard track neighboring to the gathering track are spirally formed, wherein the n is an integer and is equal or greater than 3. The apparatus includes: light beam irradiating unit for irradiating (n+1) light beams onto boundaries of the n recording tracks and the guard track, photodetecting unit for receiving (n+1) light beams reflected by the surface of the optical disc and producing (n+1) track boundary data signals, and computing unit for calculating the (n+1) track boundary data signals to produce n read-out data signals corresponding to the data signals recorded on the n recording tracks.

According to another aspect of the present invention, there is provided a method of reading data signals recorded on an optical disc on which a gathering track including n recording tracks and a guard track neighboring to the gathering track are spirally formed, wherein the n is an integer and is equal or greater than 3. The method includes the steps of: irradiating (n+1) lightbeams onto boundaries of the n recording tracks and the guard track, receiving (n+1) light beams reflected by the surface of the optical disc and producing (n+1) track boundary data signals, and calculating the (n+1) track boundary data signals to produce n read-out data signals corresponding to the data signals recorded on the n recording tracks.

According to the present invention, the boundaries of the recording tracks are traced by the light beams, and the recorded data signals are obtained by calculating the read-out data signals of the boundary of the tracks. Therefore, the recorded data signals can be accurately read out without providing complicated computing circuits.

DESCRIPTION OF THE PREFERRED EMBODIMENT

Figure 1:
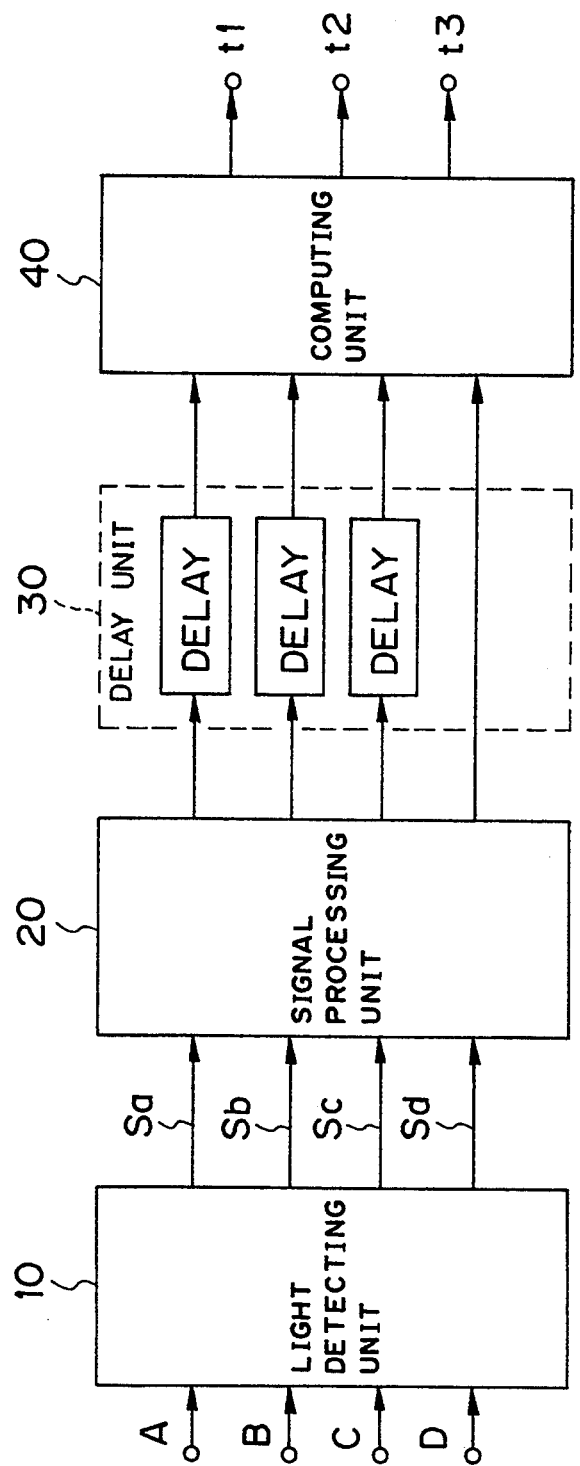
FIG.1 is a diagram showing a construction of a data signal reading apparatus according to an embodiment of the present invention.

A preferred embodiment of the present invention will be described below with reference to the accompanying drawings. FIG. 1 shows a construction of a data signal reading apparatus according to the present invention. It is to be noted that FIG. 1 shows a construction used for reproduction of an optical disc on which a guard track is formed every three recording tracks.

As shown in FIG. 1, the data signal reading apparatus according to the present invention roughly includes light a detecting unit 10, a signal processing unit 20, a delay unit 30 and a computing unit 40. To the light detecting unit 10, four light beams emitted from pickups $PU_a$–$PU_d$ and reflected by the surface of the optical disc are supplied.

Figure 2:
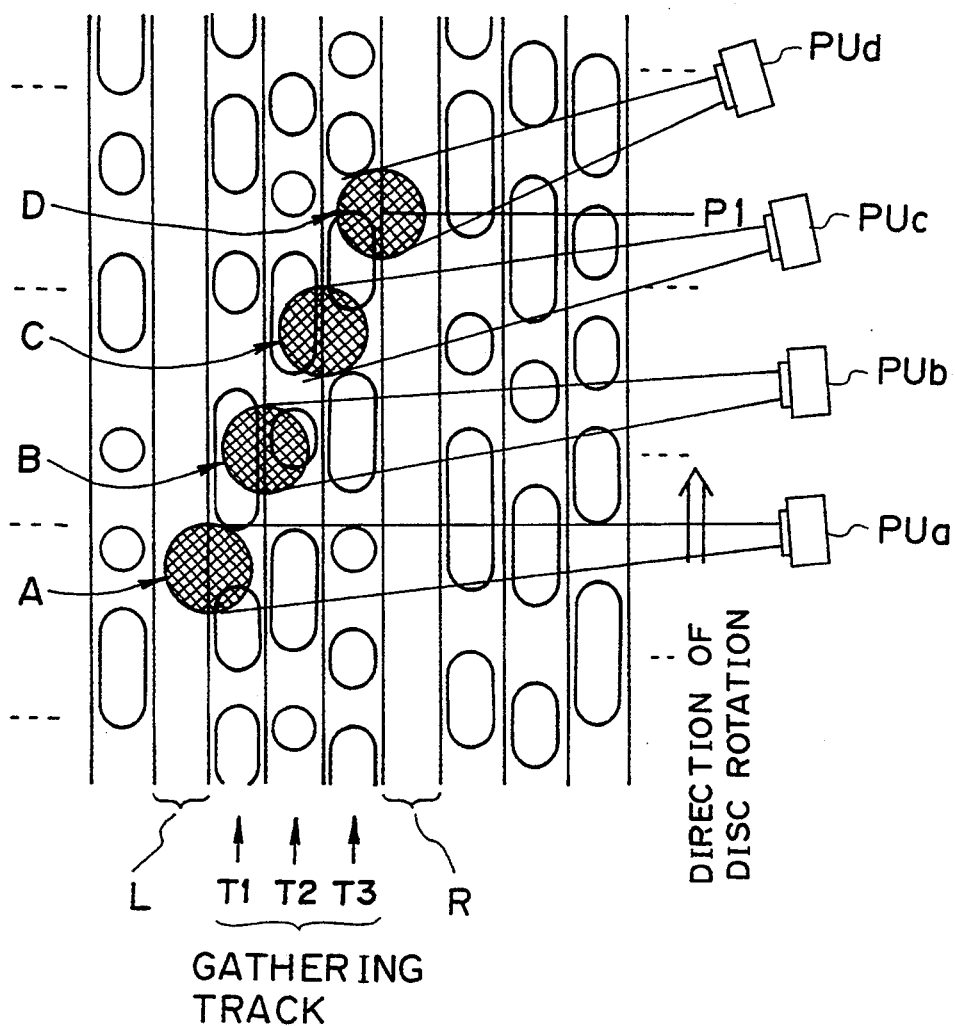
FIG. 2 is a diagram showing a positional relation between tracks of an optical disc and spots of light beams when four light beams are used.

FIG. 2 shows a relation between the tracks formed on the optical disc and light spots of the light beams. In FIG. 2, neighboring three recording tracks $T_1$–$T_3$ constitutes one broad track (hereinafter referred to as "gathering track"), and a guard track is formed every Gathering tracks so as to partition them. No data pits are formed on the guard track, and the surface of the guard track is finished to be the same reflective condition as the recording tracks without data pits (i.e., no data portion). Respective light beams A–D are emitted so as to trace boundaries of the recording tracks $T_1$–$T_3$ and guard tracks L and R. More specifically, the light beam A traces the boundary of the guard track L and the recording track $T_1$, the light beam B traces the boundary of the recording track $T_1$ and $T_2$, the light beam C traces the boundary of the recording track $T_2$ and $T_3$, and the light beam D traces the boundary of the recording track $T_3$ and the guard track R. Generally, light beam is controlled so that the light spot thereof traces center of recording track (on a central line of the recording track), and this condition is Generally called as "on-track condition". In contrast to this, in the present invention, the light beams is controlled so that the light spot thereof traces the boundary of the recording tracks (center of the central lines of two neighboring recording tracks). This condition will be hereinafter referred to as "off-track condition". In this manner, a light beam traces two recording tracks half and half, and hence the read-out data signal of the light beam includes the halves of recorded data signals of the two recording tracks.

The light detecting unit 10 converts the light beams A-D reflected by the optical disc into electrical signals to produce read-out data signals (track boundary data signals) $S_a$–$S_d$. Now assuming that the recorded data signals of the recording tracks $T_1$–$T_3$ are represented by $t_1$–$t_3$, and that read-out data signal of the guard track is zero, the track boundary data signals $S_1$–$S_d$ are represented by the following equations.

$$S_a = 0 + t_1/2 \quad (1)$$
$$S_b = (t_1 + t_2)/2$$
$$S_c = (t_2 + t_3)/2$$
$$S_d = t_3/2 + 0$$

The signal processing unit 20 conducts appropriate processing including amplification onto these track boundary data signals. The delay unit delays each of the data signals output from the signal processing unit 20 by appropriate delay times, respectively, so as to adjust the time correspondence of the data signals, and then the data signals are supplied to the computing unit 40. The computing unit 40 calculates the recorded data signals $t_1$–$t_3$ on the basis of the track boundary data signals $S_a$–$S_d$ according to the following equations.

$$t_1 = 2 \cdot S_a \quad (2)$$
$$t_2 = -S_a + S_b + S_c - S_d$$
$$t_3 = 2 \cdot S_d$$

In this manner, recording data $t_1$–$t_3$ of the recording tracks $T_1$–$T_3$ are obtained.

Figure 3:
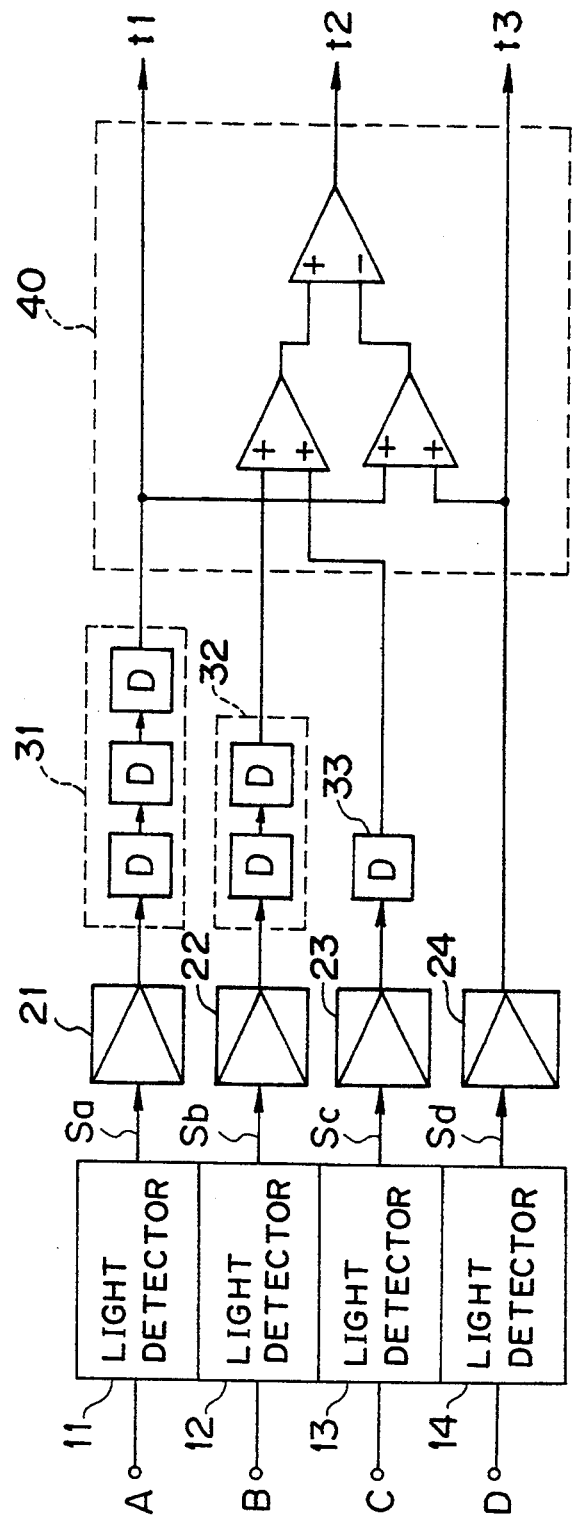
FIG. 3 is a diagram showing a detailed construction of a recorded data signal reading apparatus.

FIG. 3 shows the construction of the data signal reading apparatus shown in FIG. 1 in more detail.

In FIG. 3, light beams A-D reflected by the optical disc are fed to the light detectors 11-14, respectively, and converted into electrical signals. Then, the light detectors calculate the track boundary data signals $S_a$–$S_d$ according to the above-described equations (1). The data signals $S_a$–$S_d$ are amplified to be predetermined magnitude levels and fed to the delay unit 30. The delay unit includes delay circuits 31, 32 and 33. The delay time of the respective delay circuits are decided in accordance with the positions of the light beams A-D in a direction in which the light beams advance. More specifically, the delay time of the delay circuit 31 corresponds to a time lag from the time when the light beam A passes the reading point P1 (see. FIG. 2) until the time when the light beam D passes the point P1. Accordingly, the delay unit 30 produces the track boundary data signals of the every recording tracks at positions aligned in the radial direction of the disc, and supplies them to the computing unit 40. The computing unit 40 includes adders and a subtracter to calculate the recorded data $t_1$–$t_3$ according to the equations (2), and outputs the calculated data signals $t_1$–$t_3$.

Figure 4:
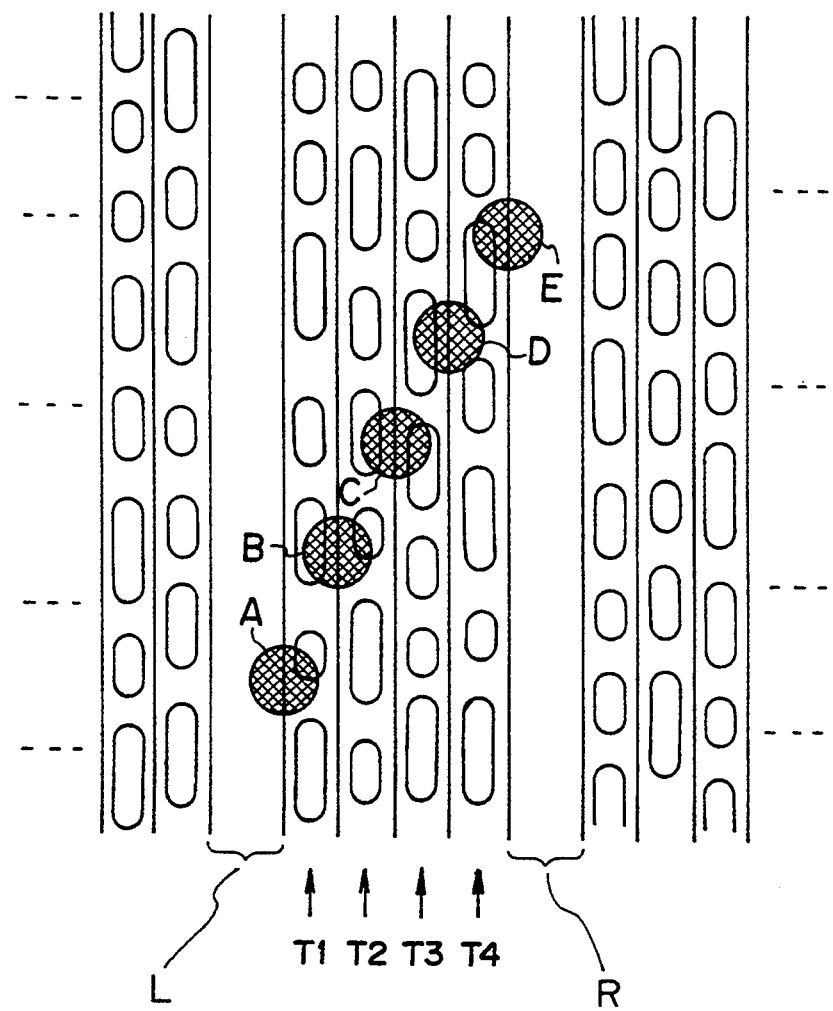
FIG. 4 is a diagram showing a relation between a track width and a spot size of a light beam.

The above description is directed to an application of the present invention to an optical disc on which guard tracks are formed every three recording tracks. However, the present invention is applicable to an optical disc on which the guard tracks are formed every more number of recording tracks. For example, five light beams should be irradiated onto the optical disc on which guard tracks are formed every four recording tracks, as shown in FIG. 4. In this case, assuming that recorded data signals of the recording tracks are $t_1$–$t_4$ and the read-out data signals of the light spots are $S_a$–$S_e$, the data signals $t_1$–$t_4$ are obtained by the following equations.

$$t_1 = 2 \cdot S_a \quad (3)$$
$$t_2 = -S_a + S_b + S_c - S_d + S_e$$
$$t_3 = S_a - S_b + S_c + S_d - S_e$$
$$t_4 = 2 \cdot S_e$$

Figure 5:
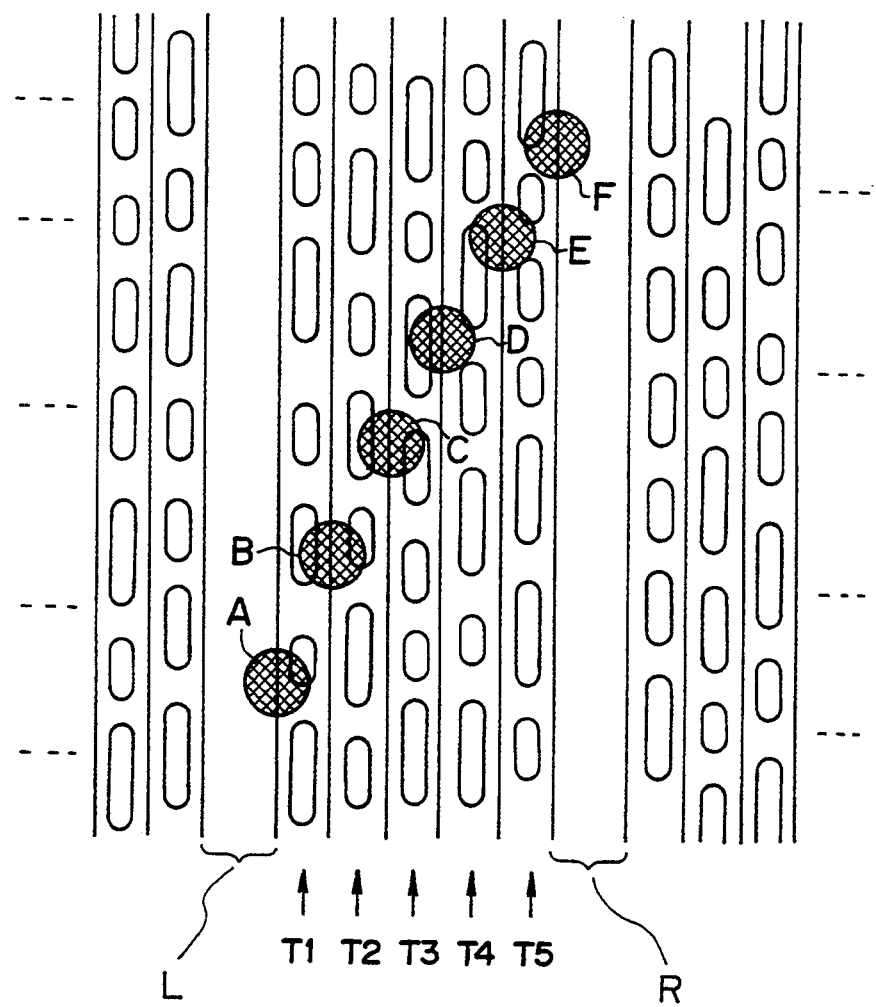
FIG. 5 is a diagram showing a positional relation between tracks of an optical disc and spots of light beams when five light beams are used.

Further, in another feature, six light beams should be irradiated onto the optical disc on which guard tracks are formed every five recording tracks, as shown in FIG. 5. In this case, assuming that recorded data signals of the recording tracks are $t_1$–$t_5$ and the read-out data signals of the light spots are $S_a$–$S_f$, the signals $t_1$–$t_5$ are obtained by the following equations.

$$t_1 = 2 \cdot S_a \quad (3)$$
$$t_2 = -S_a + S_b + S_c - S_d + S_e - S_f$$
$$t_3 = S_a - S_b + S_c + S_d - S_e + S_f$$
$$t_4 = -S_a + S_b - S_c + S_d + S_e - S_f$$
$$t_5 = 2 \cdot S_f$$

In this manner, when a gathering track includes n recording tracks, (n+1) track boundary data signals are obtained by means of reading the boundaries of the recording tracks using (n+1) light beams. The recorded data signals of the n recording tracks are calculated from the (n+1) track boundary data signals by the appropriate computations.

Figure 6:
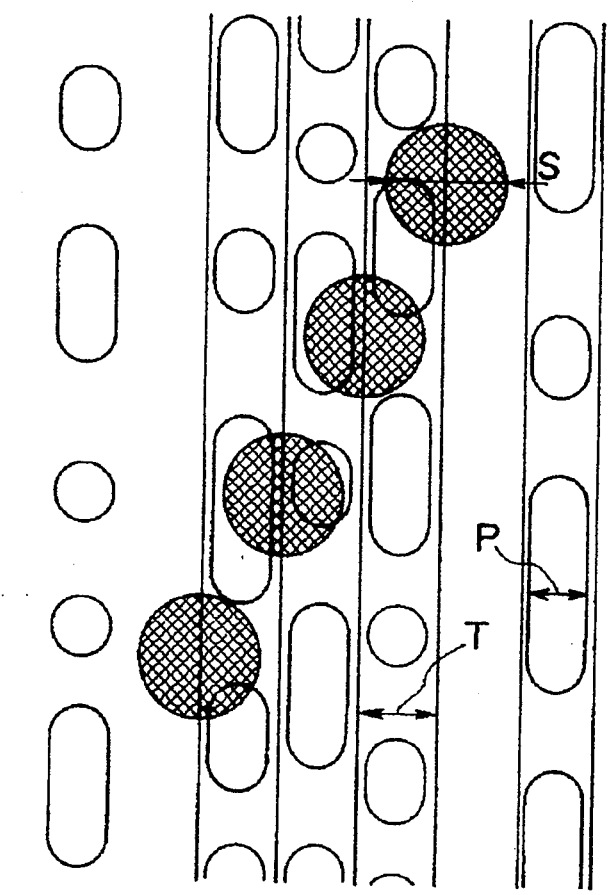
FIG. 6 is a diagram showing a positional relation between tracks of an optical disc and spots of light beams when six light beams are used.

Next, the relation between the track width and the size of the light spot will be described with reference to FIG. 6. In this invention, one light spot must cover two recording tracks but must not cover more than two recording tracks. Now, it is assumed that the track width is T, pit width is P, the diameter of the light spot is S, and n light beams are constantly in the off-track condition (tracing the boundaries of the tracks). In this case, in order to read two recording tracks, the spot diameter S should satisfy the relation of:

$$S > T - P \quad (5).$$

However, in order to obtain sufficient power of read-out data signals, it is preferable to decide diameter S to satisfy the relation of:

$$S \geq T \quad (6).$$

On the other hand, in order to prevent the light beam from covering more than two recording tracks, the diameter S should satisfy the relation of:

$$S < 3T - P \quad (7).$$

However, in consideration of the deviation of the tracking control or unevenness of the pitches of the data pits, it is preferable to decide diameter S to satisfy the relation of:

$$S \leq 2T \quad (8).$$

As a result of the above analysis, it is preferable to decide the diameter S to satisfy the relation of:

$$2T \geq S \geq T \qquad (9).$$

In addition, with respect to the width of the guard track, it is necessary that a light spot tracing most outer recording track of the gathering track does not cover the recording track in the neighboring gathering track. Therefore, the width of the guard track should be larger than a width (T) of one recording track.

In the present invention, it is necessary to control the respective light beams constantly and correctly trace the boundary of the tracks, i.e., to be in the off-track condition. This tracking control can be performed, for example, by subtracting the read-out data of the recording tracks positioned on most outer sides of the gathering track.

As described above, according to the present invention, the boundaries of the recording tracks are traced by the light beams, and the recorded data are obtained by calculating the read-out data of the boundary of the tracks. Therefore, the recorded data signals can be accurately read out without providing complicated computing circuits. In view of this, this invention is very effective to a high-density optical discs which have recording tracks of narrow width.

What is claimed is:

1. An apparatus for reading data signals recorded on an optical disc on which a gathering track including n recording tracks and a guard track neighboring to the gathering track are spirally formed, wherein the n is an integer and is equal to or greater than 3, said apparatus comprising:

light beam irradiating means for irradiating (n+1) light beams onto boundaries of the n recording tracks and the guard track;

photodetecting means for receiving (n+1) light beams reflected by the surface of the optical disc and producing (n+1) track boundary data signals, wherein said (n+1) track boundary data signals include said data signals recorded on the recording tracks and the guard track; and computing means for calculating the (n+1) track boundary data signals to produce n read-out data signals corresponding to the data signals recorded on the n recording tracks.

2. An apparatus according to claim 1, further comprising delay means for delaying each of the track boundary data signals to produce track boundary data signals of the same position with respect to the radial direction of the disc.

3. An apparatus according to claim 1, wherein said light beam irradiating means produces light spots on the optical disc so that the light spotcovers the two neighboring tracks half and half.

4. An apparatus according to claim 1, wherein the surface of the guard track is finished to be the same reflective condition as the surface of the recording tracks without data pits.

5. A method of reading data signals recorded on an optical disc on which a gathering track including n recording tracks and a guard track neighboring to the gathering track are spirally formed, wherein the n is an integer and is equal or greater than 3, as said method comprising the steps of:

irradiating (n+1) light beams onto boundaries of the n recording tracks and the guard track;

receiving (n+1) light beams reflected by the surface of the optical disc and producing (n+1) track boundary data signals, wherein said (n+1) track boundary data signals include the data signals recorded on the recording tracks and the guard track; and calculating the (n+1) track boundary data signals to produce n read-out data signals corresponding to the data signals recorded on the n recording tracks.

6. A method according to claim 5, further comprising the step of delaying each of the track boundary data signals to produce track boundary data signals of the same position with respect to the radial direction of the disc.

7. A method according to claim 5, wherein each of said track boundary data signals comprises the recorded data of the two neighboring tracks half and half.

* * * * *